United States Patent
Solyom et al.

(10) Patent No.: US 9,776,509 B2
(45) Date of Patent: Oct. 3, 2017

(54) METHOD AND APPARATUS FOR ADAPTIVE CRUISE CONTROL IN A ROAD VEHICLE

(71) Applicant: VOLVO CAR CORPORATION, Gothenburg (SE)

(72) Inventors: Stefan Solyom, Olofstorp (SE); Oskar Nordin, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 15/000,368

(22) Filed: Jan. 19, 2016

(65) Prior Publication Data
US 2016/0214480 A1    Jul. 28, 2016

(30) Foreign Application Priority Data
Jan. 26, 2015  (EP) .................................... 15152427

(51) Int. Cl.
*B60K 31/00*     (2006.01)
*B60W 30/16*     (2012.01)

(52) U.S. Cl.
CPC .............. *B60K 31/00* (2013.01); *B60W 30/16* (2013.01); *B60W 2520/10* (2013.01); *B60W 2550/308* (2013.01); *B60W 2720/106* (2013.01); *B60W 2750/308* (2013.01)

(58) Field of Classification Search
CPC .. B60W 30/14–30/16; B60W 2550/30; B60W 2550/306; B60W 2550/308; B60W 2720/10; B60W 2720/103; B60W 2720/106; B60W 2750/30; B60W 2750/302; B60W 2750/206; B60W 2750/308; B60K 31/00
See application file for complete search history.

(56) References Cited

U.S. PATENT DOCUMENTS

| | | | |
|---|---|---|---|
| 6,233,515 B1 * | 5/2001 | Engelman | B60K 31/0008 180/169 |
| 6,560,525 B1 | 5/2003 | Joyce et al. | |
| 2010/0198450 A1 | 8/2010 | Shin | |
| 2010/0198478 A1 | 8/2010 | Shin | |
| 2011/0190972 A1 | 8/2011 | Timmons et al. | |
| 2016/0357186 A1 * | 12/2016 | Dias | G05D 1/0061 |

FOREIGN PATENT DOCUMENTS

EP    1437254    7/2004

OTHER PUBLICATIONS

Extended European Search Report for European Application No. 15152427.9, Completed by the European Patent Office, Dated Jul. 14, 2015, 6 Pages.

* cited by examiner

*Primary Examiner* — Adam Mott
(74) *Attorney, Agent, or Firm* — Brooks Kushman P.C.

(57) ABSTRACT

A method and an apparatus are described for adaptive cruise control in a road vehicle, as well as a road vehicle including such an apparatus. One of four control regions is determined and a set of control parameters chosen in dependence of the detected control region. An acceleration command is provided, based on the chosen set of control parameters, using a sliding surface and a control law that ensures convergence to the sliding surface.

8 Claims, 4 Drawing Sheets

# METHOD AND APPARATUS FOR ADAPTIVE CRUISE CONTROL IN A ROAD VEHICLE

CROSS-REFERENCE TO RELATED APPLICATIONS

This application claims foreign priority benefits under 35 U.S.C. §119(a)-(d) to European patent application number 15152427.9, filed Jan. 26, 2015, which is incorporated by reference in its entirety.

TECHNICAL FIELD

The present application relate to a method and an apparatus for adaptive cruise control in a road vehicle as well as a road vehicle comprising such an apparatus.

BACKGROUND

Adaptive Cruise Control (ACC) is a control method for automatically controlling a road vehicle within a lane of traffic, maintaining a desired speed while maintaining a safe distance from other road vehicles in the same lane of travel. The essential function of ACC is target vehicle following which means that a road vehicle hosting the ACC follows a target vehicle while maintaining a predetermined separation (e.g. time or distance). The host vehicle is thus the vehicle being controlled by ACC, and the target vehicle is the vehicle in front of the host vehicle.

The host vehicle includes a device or devices capable of sensing presence, range, and a change in range, i.e. range rate, between the host vehicle and a target vehicle in the same lane of travel. A number of devices or combinations of devices are capable of generating this information, e.g. one or more of a Radio Detection And Ranging (RADAR) sensor, a Light Detection And Ranging (LIDAR) sensor, a Light Amplification by Stimulated Emission of Radiation (LASER) sensor, a SOund NAvigation and Ranging (SONAR) sensor (e.g. ultrasound), an InfraRed (IR) sensor, an image sensor (e.g. camera), vehicle location devices (e.g. GPS) or any combination thereof.

The inputs to control the ACC system within the host vehicle will usually include the sensed range, range rate and the host vehicle speed. Target vehicle following occurs when the ACC processes inputs, according to programming applying a desired range formula, and outputs acceleration commands to brake/throttle control modules according to the sign (i.e. positive acceleration command is sent to throttle control module and negative acceleration, deceleration, is sent to brake control module). The brake and throttle control modules translate the deceleration and acceleration commands into brake and throttle effort and applies brake and throttle accordingly.

Drivability is an important characteristic of a road vehicle operated by ACC. Drivability is adversely affected by quick or frequent changes in acceleration, high jerk, or other dynamic factors that detract from smooth operation of the road vehicle.

An attempt has been made at providing a method and an apparatus for target vehicle following control for adaptive cruise control having improved drivability. This attempt is described by document US 2010198478 A1.

US 2010198478 A1 describes how a host vehicle's speed is controlled with a target vehicle following control system when following a target vehicle. The target vehicle following control system monitors a range with respect to a target vehicle and a speed of the host vehicle. The target vehicle following device determines operation of the host vehicle based upon a control region by comparing the range and the speed of the host vehicle to a simple sliding surface, which defines a minimum range between the host vehicle and target vehicle, and a modified sliding surface, which increases the margin to the simple sliding surface as the speed of the host vehicle increases. A desired longitudinal acceleration/retardation of the host vehicle is determined based on the control region and is subsequently used to control operation of the host vehicle.

However, although the method and an apparatus according document US 2010198478 A1 will provide an increased margin to the simple sliding surface as the speed of the host vehicle increases that provides for improved drivability there is still room for further improved drivability of road vehicles operated by ACC.

SUMMARY

Embodiments herein aim to provide an improved method and apparatus for adaptive cruise control in a road vehicle.

This is provided through a method for adaptive cruise control in a host vehicle comprising the steps of: monitoring a range and a range rate between the host vehicle and a target vehicle travelling in front; monitoring a speed of the host vehicle; the method further comprising the steps of determining a control region of the host vehicle by: comparing the range between the host vehicle and the target vehicle to a set-point range; and if the range between the host vehicle and the target vehicle is greater than the set-point range comparing the range rate between the host vehicle and the target vehicle with a first threshold range rate between the host vehicle and the target vehicle and determining a first control region if the range rate between the host vehicle and a target vehicle is greater than the first threshold range rate and determining a second control region if the range rate between the host vehicle and a target vehicle is below the first threshold range rate; if the range between the host vehicle and the target vehicle is less than the set-point range comparing the range rate between the host vehicle and the target vehicle with a second threshold range rate between the host vehicle and the target vehicle and determining a third control region if the range rate between the host vehicle and a target vehicle is greater than the second threshold range rate and determining a fourth control region if the range rate between the host vehicle and the target vehicle is below the second threshold range rate; choosing a set of control parameters specific for the determined control region of the host vehicle; determining an acceleration command based upon the chosen set of control parameters applied to a sliding surface control law; and utilizing the acceleration command to control operation of the host vehicle.

The provision of an acceleration command based upon a chosen set of control parameters applied to a sliding surface control law to control operation of a host vehicle provides for improved drivability of a vehicle operated by ACC.

According to a second embodiment is provided that the sliding surface control law comprises a sliding surface, which once it is reached it will never leave until the set-point inter-vehicle range is attained and a convergence sequence to that sliding surface.

The provision of a sliding surface control law and a convergence sequence to that sliding surface provides for stable and smooth control.

According to a third embodiment is provided that the sliding surface is $$\sigma(x) = a_1 x_1 + a_2 x_2 = 0$$

where $x_1$ is a range and $x_2$ a range rate between the host vehicle and a target vehicle travelling in front and $\alpha_1$ and $\alpha_2$ are control parameters.

The provision of this sliding surface provides for smooth and stable control properties.

According to a fourth embodiment is provided that the control law is piecewise constant depending on which side of the sliding surface the actual operating region is in.

The provision of a control law that is piecewise constant provides for use of a very simple control law.

According to a fifth embodiment is provided that the control law that ensures convergence to the sliding surface is $$u = -\frac{1}{\alpha_2}(-\alpha_1 x_2 + \mu\text{sign}(\sigma(x)))$$

where $x_1$ is a range and $x_2$ a range rate between the host vehicle and a target vehicle travelling in front and $\alpha_1$, $\alpha_2$ and $\mu$ are control parameters and $\sigma(x)$ is the sliding surface.

The provision of the above control law provides a simple control law assuming constant speed of the target vehicle.

According to a sixth embodiment is provided that the control parameters include a first control parameter that controls the relative velocity the host vehicle should accelerate/decelerate to in order to achieve set-point inter-vehicle spacing, a second control parameter that controls how the host vehicle should accelerate/decelerate to adjust its position in order to achieve set-point inter-vehicle spacing, and a third control parameter that determines the speed of convergence to the sliding surface.

The provision of a first, second and third control parameter as above provides for smooth and stable control properties.

According to a seventh embodiment is provided that the control law, in order to compensate for target vehicle acceleration comprises an additional compensation term such that the control law is $$u = -\frac{1}{\alpha_2}(-a_1 x_2 - \alpha_2 \ddot{x}_{Target} + \mu\text{sign}(\sigma(x)))$$

where $x_1$ is a range and $x_2$ a range rate between the host vehicle and a target vehicle travelling in front and $\alpha_1$, $\alpha_2$ and u are control parameters and $\sigma(x)$ is the sliding surface and $-\alpha_2 \ddot{x}_{Target}$ is the target vehicle acceleration compensation term.

The provision of the modified control law as above provides the ability to compensate for target vehicle acceleration.

According to an eight embodiment is provided an apparatus for adaptive cruise control of a host vehicle according to the above method that comprises: a measuring device or devices capable of sensing presence, range, and a range rate, between the host vehicle and a target vehicle in the same lane of travel; a set-point calculating device arranged to receive a driver selected headway as well as the host vehicle velocity and the range rate between the host vehicle and the target vehicle and calculate and output a set-point value; a region detection unit that, from the set-point value, along with the range and range rate between the host vehicle and the target vehicle as well as a pre-determined first threshold range rate, and a pre-determined second threshold range rate, detects one of four pre-determined control regions and outputs a signal representative thereof; three switches, each one of which is used to, based on the signal representative of the determined control region, select a respective control parameter and appropriate for the determined control region from a respective set of four control parameters and; an acceleration control module arranged to provide an acceleration command based on the control parameters and from the first, second and third control parameter switches as well as the range and range rate between the host vehicle and target vehicle.

The provision of an acceleration command based upon a chosen set of control parameters applied to a sliding surface control law to control operation of a host vehicle provides for improved drivability of a vehicle operated by ACC.

According to a final embodiment is provided a road vehicle that comprises an apparatus for adaptive cruise control of a host vehicle as above.

A road vehicle that comprises an apparatus for adaptive cruise control of a host vehicle as above provides for improved drivability of a vehicle operated by ACC.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
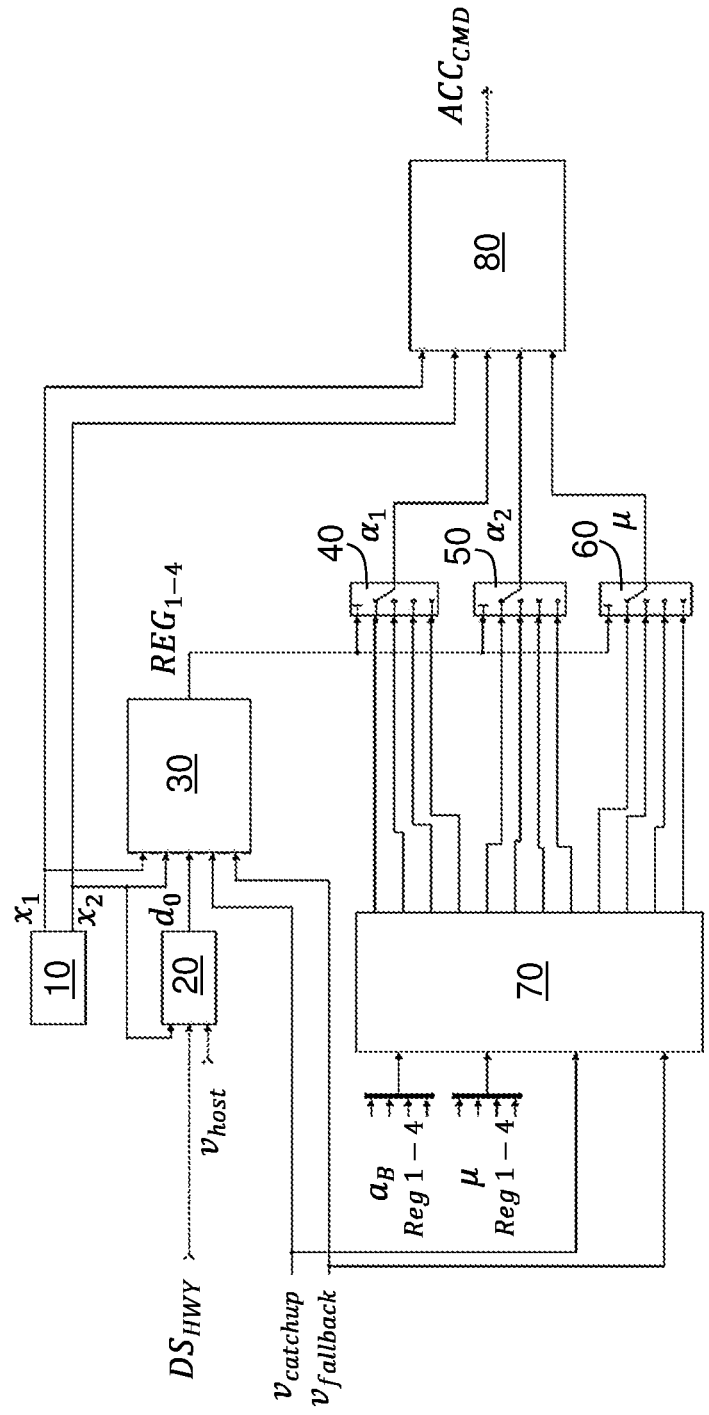
FIG. 1 is a schematic illustration of an exemplary target vehicle following control system of an adaptive cruise control

In overview, as illustrated in FIG. 1, embodiments herein relate to a feedback control system for adaptive cruise control (ACC), using sliding mode control, of a road vehicle 1 hosting the system.

FIG. 1 depicts an exemplary target vehicle 2 following control system of an adaptive cruise control, in accordance with the present disclosure. The target vehicle 2 following control system includes a measuring device 10 or devices capable of sensing presence, range $x_1$, and a change in range, i.e. range rate $x_2$, between the host vehicle 1 and a target vehicle 2 in the same lane of travel, e.g. comprising one or more of a RADAR sensor, a LIDAR sensor, a LASER sensor, a SONAR sensor (e.g. an ultrasound sensor), an IR sensor, an image sensor (e.g. a camera sensor), a vehicle location device (e.g. a GPS) or any combination thereof.

The range rate $x_2$ is a velocity that describes the rate that a target vehicle 2 moves toward or away from the measuring device 10 of the host vehicle 1.

The measuring device 10 outputs the range $x_1$ between the host vehicle 1 and the target vehicle 2 as well as the range rate $x_2$ between the host vehicle 1 and the target vehicle 2.

A set-point calculating device 20 is arranged to receive a driver selected headway $DS_{HWY}$ as well as the host vehicle 1 velocity $v_{host}$ and the range rate $x_2$ between the host vehicle 1 and the target vehicle 2 and calculate and output a set-point value $d_0$.

The set-point value $d_0$, along with the range $x_1$ and range rate $x_2$ between the host vehicle 1 and the target vehicle 2 as well as a pre-determined first threshold range rate, $v_{catchup}$, and a pre-determined second threshold range rate, $v_{fallback}$, are brought to a region detection unit 30 that detects one of four pre-determined control regions 101, 102, 103, 104 and outputs a signal $REG_{1-4}$ representative thereof.

The signal $REG_{1-4}$ representative of the determined control region 101, 102, 103, 104 is used to control three switches 40, 50, 60, each one of which is used to select a respective tunable control parameter appropriate for the determined control region 101, 102, 103, 104 from a respective set of four pre-tuned control parameters.

The first control parameter switch is arranged to select a control parameter $\alpha_1$ in dependence of the detected region from a set of four region dependent $\alpha_1$ values.

The second control parameter switch is arranged to select a control parameter $\alpha_2$ in dependence of the detected region from a set of four region dependent $\alpha_2$ values.

The third control parameter switch is arranged to select a control parameter $\mu$ in dependence of the detected region from a set of four region dependent $\mu$ values.

The sets of control parameters $\alpha_1$, $\alpha_2$ and $\mu$ are provided to the control parameter switches 40, 50, 60 from a control parameter controller 70 that is arranged to provide the sets of control parameters $\alpha_1$, $\alpha_2$ and $\mu$ for each of the four regions based on the pre-determined first and second threshold range rates, $v_{catchup}$, $v_{fallback}$ and a respective pre-tuned value of the acceleration $\alpha_B$ the vehicle is to use to adjust its position when a target vehicle 2, having approximately zero relative velocity to the host vehicle 1 and a distance far away from the set-point value $d_0$, is acquired for each respective one of the four regions as well as a respective pre-tuned value of a third control parameter $\mu$ that determines the speed of convergence to the sliding surface $\sigma(x)$ for each respective one of the four regions 101, 102, 103, 104.

The control parameters $\alpha_1$, $\alpha_2$ and $\mu$ from the first 40, second 50 and third 60 control parameter switches as well as the range $x_1$ and range rate $x_2$ between the host and target vehicles are brought as inputs to an acceleration control module 80, which is arranged to provide an acceleration command $ACC_{CMD}$, i.e. an acceleration or deceleration command to a brake control module (not shown), and a powertrain output torque control module (not shown) of the host vehicle 1.

Those of ordinary skill in the art will understand that the set-point calculating device 20, region detection unit 30, control parameter controller 70, and acceleration control module 80, as well as any other device, unit, controller and/or module described herein, may comprise a microprocessor, microcontroller, programmable digital signal processor (DSP) or another programmable device. Such a device, unit, controller or module may also, or instead, include an application specific integrated circuit (ASIC), a programmable gate array or programmable array logic, a programmable logic device, or a digital signal processor (DSP). Where the device, unit, controller or module comprises a programmable device such as a microprocessor, microcontroller or programmable digital signal processor, the device, unit, controller or module may further include a memory or storage for storing computer executable code that are executable by the programmable device, unit, controller or module for controlling operation thereof and/or for performing the particular algorithm(s) represented by the functions and/or operations described herein.

In the following will now be described an appropriate sliding surface $\sigma(x)$ and control law u for implementing the teachings of the present disclosure.

A simplified model of the longitudinal spacing error between the two vehicles, host vehicle 1 and target vehicle 2, is given by:

$$\dot{x}_1 = -x_2$$

$$J\dot{x}_2 = u$$

Where $x_1 = x_{Target} - x_{Host}$ is the range between the host 1 and target 2 vehicles, $x_2$ is the range rate between the host 1 and target 2 vehicles.

The model assumes constant speed of the target vehicle 2 for ease of presentation of the concept. Time varying acceleration is easily included in the model and in the control law u. Moreover, there is no actuator dynamics considered in the model but can be included as well. Vehicle testing has shown great robustness against actuator dynamics, as commonly seen with sliding mode controllers.

The idea of sliding mode control is to split the control action into two operating modes. One, is the so called sliding surface $\sigma(x)$, which once the system has reached, it will never leave until the reference value is attained. Such a sliding surface $\sigma(x)$ for ACC applications can typically be a constant time gap trajectory.

The second operating mode is a convergence sequence to the above mentioned sliding surface $\sigma(x)$. This is done with a very simple control law u which is piecewise constant depending on which side of the sliding surface $\sigma(x)$ the actual operating region is in.

The sliding surface of choice is:

$$\sigma(x) = \alpha_1 x_1 + \alpha_2 x_2 = 0$$

Where $\alpha_1$ and $\alpha_2$ are first and second control parameters.

Once this sliding surface $\sigma(x)$ is reached, the system will stay on this sliding surface $\sigma(x)$ with the dynamics:

$$\dot{\sigma}(x) = \alpha_2 \dot{x}_2 + \alpha_1 x_2 = 0$$

Stability and performance of this sliding surface $\sigma(x)$ will set constraints on the choice of the first and second control parameters $\alpha_1$ and $\alpha_2$.

The control law u that ensures convergence to the sliding surface $\sigma(x)$ is then:

$$u = -\frac{1}{\alpha_2}(-\alpha_1 x_2 + \mu \operatorname{sign}(\sigma(x)))$$

Where $\mu$ is a third control parameter that determines the speed of convergence to the sliding surface $\sigma(x)$.

This control law u guarantees stability of the ACC based on the Lyapunov function:

$$V(x) = \sigma^2(x)$$

With $$\dot{V}(x) = -\mu|\sigma(x)|$$

In case of ACC it is possible to give good interpretation for the three control parameters $\alpha_1$, $\alpha_2$ and $\mu$ as follows:

- $v_{catchup} = -\mu/\alpha_1$ is the so called catchup speed for the ACC system. That is the relative speed that the host vehicle 1 aims for when closing in on target vehicle 2 from a distance further away than the set-point $d_0$ in order to achieve set-point $d_0$ inter-vehicle spacing. Correspondingly, $v_{fallback}$ is the so called fallback speed for the ACC system. That is the relative speed the host vehicle 1 aims for when falling away from target vehicle 2 from distance closer than the set-point $d_0$ in order to achieve set-point $d_0$ inter-vehicle spacing.
- $a_B = \mu/\alpha_2$ is the acceleration the host vehicle 1 is to use to adjust its position when a target vehicle 2 is acquired to which the relative speed is approximately zero and far from the set-point value $d_0$.
- $t = \alpha_2/|\alpha_1|$ Is the time it takes to converge to the sliding surface $\sigma(x)$.

It is often the case that ACC needs quantitatively different behaviors depending on different driving situations, such as: catchup, fall back, overspeed and overshooting the desired inter-vehicle gap. However, extensive testing and development of ACC systems has shown that the qualitative behavior is the same. This means that the same control structure can be used but the three control parameters $\alpha_1$, $\alpha_2$ and $\mu$ should be changed. This will typically lead to a gain scheduling scheme. In vehicle testing it has been shown that four regions are sufficient to obtain a high performance ACC. Moreover, not all the parameters in the four sets of three parameters must necessarily be changed from one region to another.

Figure 2:
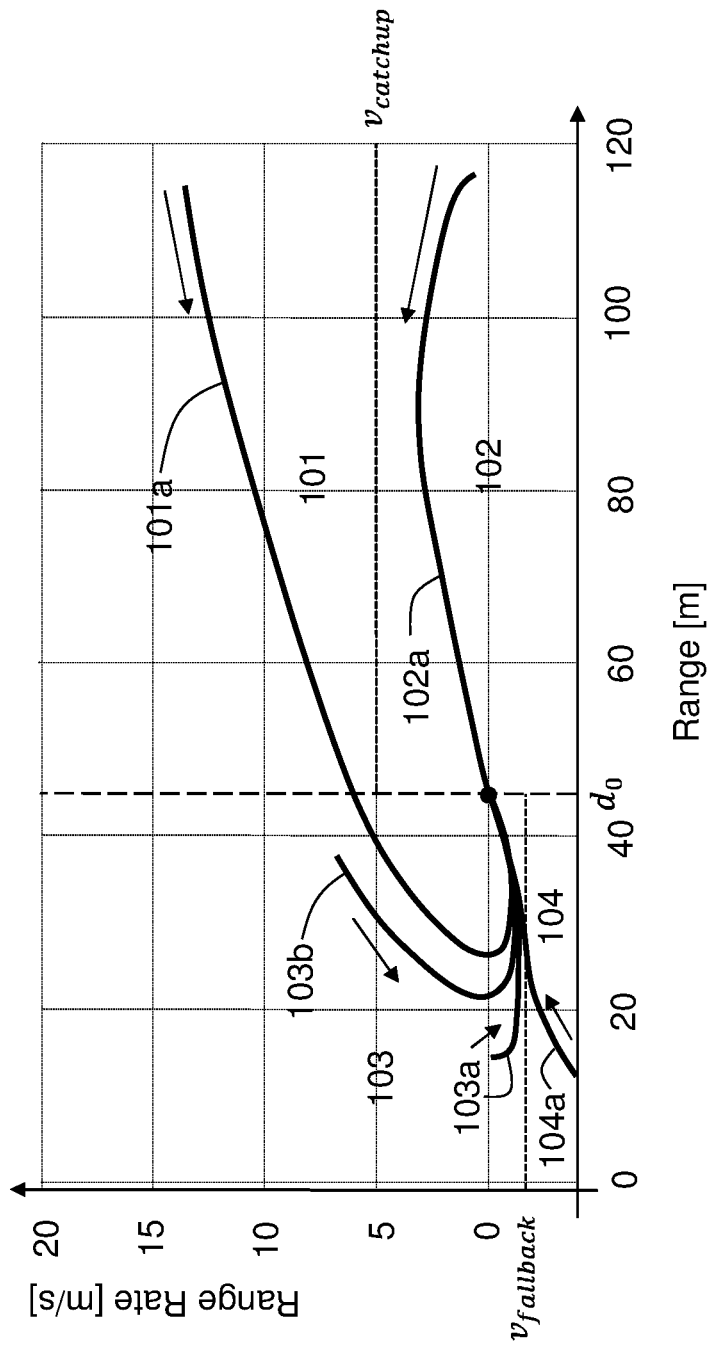
FIG. 2 is a schematic illustration of trajectory control for different use cases according to FIGS. 3-7.

The four regions, 101, 102, 103 and 104, as illustrated in FIG. 2, are provided to account for the following scenarios:
101. Overspeed—i.e. above catch-up speed, the host vehicle 1 attempting to decrease its speed in order to account for a target vehicle 2 that moves significantly slower.
102. Catch-up—i.e. the host vehicle 1 attempting to increase its speed to catch-up a target vehicle 2, that moves faster or not significantly slower, from distances further away than the set-point $d_0$
103. Overshoot—i.e. the host vehicle 1 attempting to decrease its speed in order to account for being closer to a target vehicle 2 than intended.
104. Fall-back—i.e. the host vehicle 1 attempting to adapt its speed, increase or decrease, to a slightly slower speed than the target vehicle 2 in front, in order to increase the distance towards the set-point $d_0$ The control law u has a very discrete nature due to the sign function. This will introduce a chattering behavior near the set-point $d_0$. According to common practice, well known to the person skilled in the art, when dealing with a sliding mode controller, this function is replaced with appropriate smooth functions near the set-point $d_0$ and also between regions. If a smooth function is chosen accordingly, it has been proven in literature that the convergence properties of a controller are not lost.

In case of time varying acceleration, using the same methodology as before, it is shown that the controller u becomes:

$$u = -\frac{1}{\alpha_2}(-\alpha_1 x_2 - \alpha_2 \ddot{x}_{Target} + \mu \operatorname{sign}(\sigma(x)))$$

That is, the same controller u as before but with an additional compensation term, $-\alpha_2 \ddot{x}_{Target}$, for the target vehicle acceleration $\ddot{x}_{Target}$.

Thus, in accordance with the above is also provided a method for adaptive cruise control in a host vehicle 1 comprising the steps of: monitoring a range $x_1$ and a range rate $x_2$ between the host vehicle 1 and a target vehicle 2 travelling in front; monitoring a speed of the host vehicle 1; and the steps of determining a control region 101, 102, 103, 104 of the host vehicle 1 by: comparing the range $x_1$ between the host vehicle 1 and the target vehicle 2 to a set-point $d_0$ range; and if the range $x_1$ between the host vehicle 1 and the target vehicle 2 is greater than the set-point $d_0$ range comparing the range rate $x_2$ between the host vehicle 1 and the target vehicle 2 with a first threshold range rate $v_{catchup}$ between the host vehicle 1 and the target vehicle 2 and determining a first control region 101 if the range rate $x_2$ between the host vehicle and a target vehicle is greater than the first threshold range rate $v_{catchup}$ and determining a second control region 102 if the range rate $x_2$ between the host vehicle 1 and a target vehicle 2 is below the first threshold range rate $v_{catchup}$; if the range $x_1$ between the host vehicle 1 and the target vehicle 2 is less than the set-point $d_0$ range comparing the range rate $x_2$ between the host vehicle 1 and the target vehicle 2 with a second threshold range rate $v_{fallback}$ between the host vehicle 1 and the target vehicle 2 and determining a third control region 103 if the range rate $x_2$ between the host vehicle 1 and a target vehicle 2 is greater than the second threshold range rate $v_{fallback}$ and determining a fourth control region 104 if the range rate $x_2$ between the host vehicle 1 and the target vehicle 2 is below the second threshold range rate $v_{fallback}$; choosing a set of control parameters $\alpha_1$, $\alpha_2$, $\mu$ specific for the determined control region 101, 102, 103, 104 of the host vehicle 1; determining an acceleration command $ACC_{CMD}$ based upon the chosen set of control parameters $\alpha_1$, $\alpha_2$, $\mu$ for the determined control region 101, 102, 103, 104 applied to a sliding surface $\sigma(x)$ control law u; and utilizing the acceleration command $ACC_{CMD}$ to control operation of the host vehicle 1.

According to some embodiments herein the sliding surface $\sigma(x)$ control law u comprises a sliding surface $\sigma(x)$, which once it is reached it will never leave until the set-point $d_0$ inter-vehicle range $x_1$ is attained and a convergence sequence to that sliding surface $\sigma(x)$.

According to further embodiments herein the sliding surface $\sigma(x)$ is $$\sigma(x) = \alpha_1 x_1 + \alpha_2 x_2 = 0$$

where $x_1$ is a range and $x_2$ a range rate between the host vehicle 1 and a target vehicle 2 travelling in front and $\alpha_1$ and $\alpha_2$ are control parameters.

According to still further embodiments herein the control law u is piecewise constant depending on which side of the sliding surface $\sigma(x)$ the actual operating region is in.

According to yet further embodiments herein the control law u that ensures convergence to the sliding surface $\sigma(x)$ is $$u = -\frac{1}{\alpha_2} - \alpha_1 x_2 + \mu \mathrm{sign}(\sigma(x))$$

where $x_1$ is a range and $x_2$ a range rate between the host vehicle 1 and a target vehicle 2 travelling in front and $\alpha_1$, $\alpha_2$ and $\mu$ are control parameters and $\sigma(x)$ is the sliding surface.

According to some further embodiments herein the control parameters include a first control parameter $\alpha_1$ that controls the relative velocity the host vehicle 1 should accelerate/decelerate to in order to achieve set-point $d_0$ inter-vehicle spacing, a second control parameter $\alpha_2$ that controls how the host vehicle 1 should accelerate/decelerate to adjust its position in order to achieve set-point $d_0$ inter-vehicle spacing, and a third control parameter $\mu$ that determines the speed of convergence to the sliding surface.

According to still yet further embodiments herein the control law u, in order to compensate for target vehicle acceleration $\ddot{x}_{Target}$ comprises an additional compensation term $-\alpha_2 \ddot{x}_{Target}$ such that the control law u is $$u = -\frac{1}{\alpha_2} - a_1 x_2 - \alpha_2 \ddot{x}_{Target} + \mu \mathrm{sign}(\sigma(x))$$

where $x_1$ is a range and $x_2$ a range rate between the host vehicle 1 and a target vehicle 2 travelling in front and $\alpha_1$, $\alpha_2$ and $\mu$ are control parameters and $\sigma(x)$ is the sliding surface and $-\alpha_2 \ddot{x}_{Target}$ is the target vehicle acceleration compensation term.

FIG. 2 illustrates the trajectory control for different use cases, as will be further described with reference to FIGS. 3-8. The horizontal axis represent range $x_1$ and the vertical axis range rate $x_2$ seen as a closing velocity between the host vehicle 1 and the target vehicle 2. The set-point distance $d_0$ is marked by a vertical dashed line and the first threshold range rate $v_{catchup}$ and the second threshold range rate $v_{fallback}$ are marked by respective horizontal dotted lines. Respective control trajectories 101a, 102a, 103a, 103b and 104a are shown and described further in conjunction with the respective use cases illustrated in FIGS. 3-7. The direction of the respective control trajectories 101a, 102a, 103a, 103b and 104a are indicated by the adjacent arrows. All control trajectories 101a, 102a, 103a, 103b and 104a converge to the set-point $d_0$ for a zero relative velocity between the host vehicle 1 and a target vehicle 2.

Figure 3:
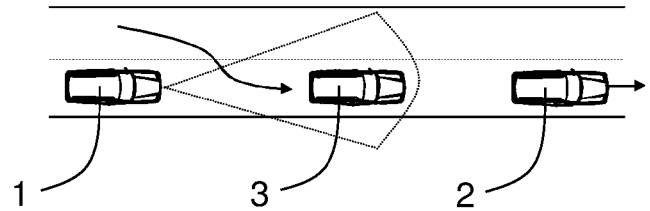
FIG. 3 is a schematic illustration of a first use case.

FIG. 3 illustrates a first use case. A vehicle 3 cuts-in with the same speed as the host vehicle 1 (i.e. the relative speed between the host vehicle 1 and the cut-in vehicle 3 is approximately zero). "Fallback speed", i.e. the second threshold range rate $v_{fallback}$, will limit the fallback according to trajectory 103a to the correct following set-point distance $d_0$.

Figure 4:
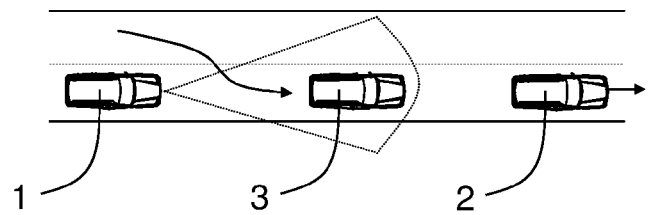
FIG. 4 is a schematic illustration of a second use case.

FIG. 4 illustrates a second use case, similar to the first use case according to FIG. 3 but with relative speed between the cut-in vehicle 3 and the host vehicle 1. Decelerating, e.g. trough relatively hard braking, to "Fallback speed", i.e. the second threshold range rate $v_{fallback}$, according to trajectory 103b will ensure fallback to the correct following set-point distance $d_0$.

Figure 5:
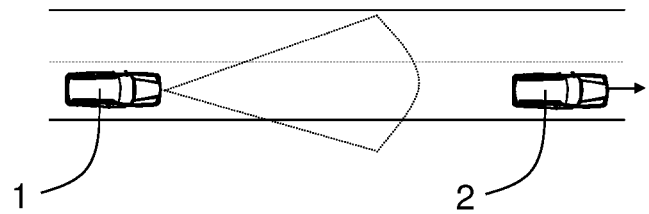
FIG. 5 is a schematic illustration of a third use case.

FIG. 5 illustrates a third use case where an approaching lead or target vehicle 2 is detected at a long distance with significant relative speed to the host vehicle 1. Decelerating, e.g. trough limited braking, to "Fallback speed", i.e. the second threshold range rate $v_{fallback}$, according to trajectory 101a will ensure fallback to the correct following set-point distance $d_0$.

Figure 6:
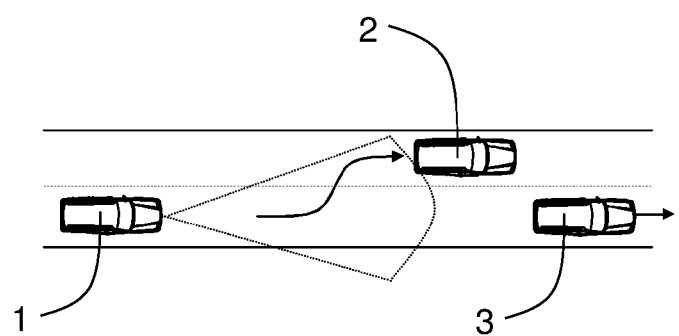
FIG. 6 is a schematic illustration of a fourth use case.

FIG. 6 illustrates a fourth use case where the lead or target vehicle 2 cuts-out revealing a new lead or target vehicle 3. "Catch-up speed", i.e. the first threshold range rate $v_{catchup}$, will limit closing speed during the catchup phase according to trajectory 102a.

Figure 7:
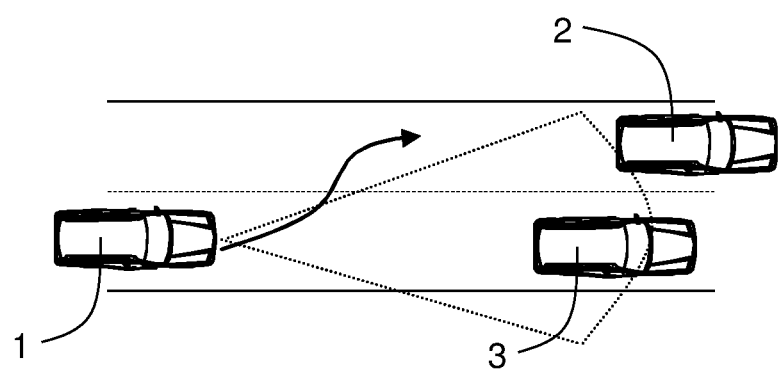
FIG. 7 is a schematic illustration of a fifth use case.

FIG. 7 illustrates a fifth use case where the host vehicle 1 performs a lane change to a faster lane, overtaking a vehicle 3 in the slow lane. A new lead or target vehicle 2 drives faster than the host vehicle 1. Accelerating according to trajectory 104a will bring the host vehicle 1 towards the correct following set-point distance $d_0$.

In accordance with the present application is also envisaged an apparatus for adaptive cruise control of a host vehicle 1 comprising a target vehicle 2 following control system as above and arranged to operate in accordance with the above described method.

In accordance with the present application is also envisaged a road vehicle comprising an apparatus as described in the foregoing.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for adaptive cruise control in a host vehicle, the method comprising:
monitoring a range and a range rate between the host vehicle and a target vehicle travelling in front;
monitoring a speed of the host vehicle;
determining a control region of the host vehicle by
comparing the range between the host vehicle and the target vehicle to a set-point range; and
if the range between the host vehicle and the target vehicle is greater than the set-point range, comparing the range rate between the host vehicle and the target vehicle with a first threshold range rate between the host vehicle and the target vehicle and determining a first control region if the range rate between the host vehicle and the target vehicle is greater than the first threshold range rate, and determining a second control region if the range rate between the host vehicle and the target vehicle is below the first threshold range rate;

if the range between the host vehicle and the target vehicle is less than the set-point range, comparing the range rate between the host vehicle and the target vehicle with a second threshold range rate between the host vehicle and the target vehicle, and determining a third control region if the range rate between the host vehicle and the target vehicle is greater than the second threshold range rate, and determining a fourth control region if the range rate between the host vehicle and the target vehicle is below the second threshold range rate;

choosing a set of control parameters specific for the determined control region of the host vehicle;

determining an acceleration command based upon the chosen set of control parameters applied to a sliding surface control law, wherein the chosen set of control parameters includes a first control parameter that controls the relative velocity the host vehicle should accelerate/decelerate to in order to achieve the set-point range, a second control parameter that controls how the host vehicle should accelerate/decelerate to adjust its position in order to achieve the set-point range, and a third control parameter that determines the speed of convergence to the sliding surface; and utilizing the acceleration command to control operation of the host vehicle.

2. The method according to claim 1 wherein the sliding surface control law comprises a sliding surface, which once reached will never be left until the set-point inter-vehicle range is attained and a convergence sequence to that sliding surface.

3. The method according to claim 2 wherein the sliding surface is defined as $$\sigma(x)=\alpha_1 x_1 + \alpha_2 x_2 = 0$$

where ($\sigma(x)$) is the sliding surface, $x_1$ is the range and $x_2$ the range rate between the host vehicle and the target vehicle travelling in front of the host vehicle, and $\alpha_1$ and $\alpha_2$ are control parameters.

4. The method according to claim 2 wherein the sliding surface control law is piecewise constant depending on which side of the sliding surface the actual operating region is in.

5. The method according to claim 3 wherein the sliding surface control law that ensures convergence to the sliding surface is $$u = -\frac{1}{\alpha_2}(-\alpha_1 x_2 + \mu \text{sign}(\sigma(x)))$$

where $x_1$ is the range and $x_2$ the range rate between the host vehicle and the target vehicle travelling in front of the host vehicle, and $\alpha_1$, $\alpha_2$ and $\mu$ are control parameters and $\sigma(x)$ is the sliding surface.

6. The method according to claim 1 wherein the sliding surface control law, in order to compensate for target vehicle acceleration comprises an additional compensation term such that the control law is $$u = -\frac{1}{\alpha_2}(-a_1 x_2 - \alpha_2 \ddot{x}_{Target} + \mu \text{sign}(\sigma(x)))$$

where $x_1$ is the range and $x_2$ the range rate between the host vehicle and the target vehicle travelling in front of the host vehicle, and $\alpha_1$, $\alpha_2$ and $\mu$ are control parameters and $\sigma(x)$ is the sliding surface and $-\alpha_2 \ddot{x}_{Target}$ is the target vehicle acceleration compensation term.

7. An apparatus for adaptive cruise control of a host vehicle, the apparatus comprising:

a measuring device or devices capable of sensing presence, range, and a range rate, between the host vehicle and a target vehicle in the same lane of travel;

a set-point calculating device arranged to receive a driver selected headway as well as a host vehicle velocity and range rate between the host vehicle and the target vehicle traveling in front of the host vehicle and calculate and output a set-point range;

a region detection unit that, from the set-point value, along with the range and range rate between the host vehicle and the target vehicle as well as a first threshold range rate and a second threshold range rate, is configured to detect one of four pre-determined control regions and output a signal representative thereof;

three switches, each one of which is configured to, based on the signal representative of the determined control region, select a control parameter appropriate for the determined control region from a plurality of control parameters; and an acceleration control module arranged to provide an acceleration command based on the control parameters from the first, second and third control parameter switches as well as the range and range rate between the host vehicle and the target vehicle;

wherein the apparatus is configured to monitor the range and the range rate between the host vehicle and the target vehicle;

monitor a speed of the host vehicle;

determine the control region of the host vehicle by comparing the range between the host vehicle and the target vehicle to the set-point range; and if the range between the host vehicle and the target vehicle is greater than the set-point range, comparing the range rate between the host vehicle and the target vehicle with a first threshold range rate between the host vehicle and the target vehicle and determine a first control region if the range rate between the host vehicle and the target vehicle is greater than the first threshold range rate, and determining a second control region if the range rate between the host vehicle and the target vehicle is below the first threshold range rate;

if the range between the host vehicle and the target vehicle is less than the set-point range, comparing the range rate between the host vehicle and the target vehicle with a second threshold range rate between the host vehicle and the target vehicle, and determining a third control region if the range rate between the host vehicle and the target vehicle is greater than the second threshold range rate, and determining a fourth control region if the range rate between the host vehicle and the target vehicle is below the second threshold range rate;

choose a set of control parameters specific for the determined control region of the host vehicle;

determine the acceleration command based upon the chosen set of control parameters applied to a sliding surface control law, wherein the chosen set of control parameters includes a first control parameter that controls the relative velocity the host vehicle should accelerate/decelerate to in order to achieve the set-point range, a second control parameter that controls how the host vehicle should accelerate/decelerate to adjust its position in order to achieve the set-point range, and a third control parameter that determines the speed of convergence to the sliding surface; and utilize the acceleration command to control operation of the host vehicle.

8. A road vehicle comprising an apparatus for adaptive cruise control of a host vehicle according to claim 7.

* * * * *